(12) United States Patent
Yim et al.

(10) Patent No.: US 9,848,210 B2
(45) Date of Patent: Dec. 19, 2017

(54) ERROR CONCEALMENT METHOD USING SPATIAL INTERPOLATION AND EXEMPLAR-BASED IMAGE INPAINTING

(71) Applicant: Konkuk University Industrial Cooperation Corp, Seoul (KR)

(72) Inventors: Changhoon Yim, Seoul (KR); Byungjin Chung, Seoul (KR)

(73) Assignee: KONKUK UNIVERSITY INDUSTRIAL COOPERATION CORP, Seoul (KR)

( * ) Notice: Subject to any disclaimer, the term of this patent is extended or adjusted under 35 U.S.C. 154(b) by 118 days.

(21) Appl. No.: 14/973,048

(22) Filed: Dec. 17, 2015

(65) Prior Publication Data

US 2016/0182920 A1    Jun. 23, 2016

(30) Foreign Application Priority Data

Dec. 18, 2014 (KR) .................. 10-2014-0183393
Dec. 18, 2014 (KR) .................. 10-2014-0183394
Dec. 18, 2014 (KR) .................. 10-2014-0183395

(51) Int. Cl.
   *H04N 19/895*   (2014.01)
   *H04N 19/89*    (2014.01)
   *H04N 19/139*   (2014.01)
   *H04N 19/44*    (2014.01)

(52) U.S. Cl.
   CPC ......... *H04N 19/895* (2014.11); *H04N 19/139* (2014.11); *H04N 19/44* (2014.11)

(58) Field of Classification Search
   CPC ..... H04N 19/139; H04N 19/44; H04N 19/895

USPC .................................................. 375/240.27
See application file for complete search history.

(56) References Cited

U.S. PATENT DOCUMENTS

| | | | | |
|---|---|---|---|---|
| 9,479,795 | B2* | 10/2016 | Cherigui | H04N 19/52 |
| 2008/0112626 | A1* | 5/2008 | Sun | G06K 9/0008 |
| | | | | 382/232 |
| 2008/0317137 | A1* | 12/2008 | Shin | H04N 19/105 |
| | | | | 375/240.27 |

(Continued)

FOREIGN PATENT DOCUMENTS

| | | | |
|---|---|---|---|
| KR | 20080048904 A | * | 6/2008 |
| KR | 10-0886647 B1 | | 3/2009 |

OTHER PUBLICATIONS

Ebdelli et al., Loss Concealment Based on Video Inpainting for Robust Video Communication, 2012, EURASIP, pp. 1910-1914.*

(Continued)

*Primary Examiner* — Christopher S Kelley
*Assistant Examiner* — Kathleen Walsh
(74) *Attorney, Agent, or Firm* — Paratus Law Group, PLLC

(57) ABSTRACT

A hybrid error concealment method including: receiving an image including a source area and a restoration area to be restored by means of a decoder; determining a target patch in which a target pixel having the highest priority is at the center among pixels positioned in a boundary area of the restoration area by means of the decoder; and performing restoring by exemplar-based image inpainting for the target patch based on a difference between the target patch and the final source patch of the source area or performing spatial interpolation for the target pixel by means of the decoder.

15 Claims, 12 Drawing Sheets

(56) References Cited

U.S. PATENT DOCUMENTS

| | | | | |
|---|---|---|---|---|
| 2009/0103617 A1* | 4/2009 | Au | ....................... | H04N 19/176 375/240.13 |
| 2010/0322309 A1* | 12/2010 | Huang | ................. | H04N 19/895 375/240.12 |
| 2011/0013028 A1* | 1/2011 | Zhou | ..................... | G06T 3/4038 348/208.6 |
| 2012/0288015 A1* | 11/2012 | Zhang | ..................... | H04N 7/54 375/240.26 |
| 2013/0170746 A1* | 7/2013 | Zhang | ..................... | G06T 5/001 382/165 |

OTHER PUBLICATIONS

Kwok et al., Multi-Directional Interpolation for Spatial Error Concealment, 1993, IEEE, pp. 455-460.*

Liu et al., Image Block Error Recovery Using Adaptive Patch_Based Inpainting, 2011, Springer-Verlag Berlin Heidelberg, pp. 110-124.*

Martinez-Noriega et al., Exemplar-Based Image Inpainting: Fast Priority and Coherent Nearest Neighbor Search, 2012, IEEE, pp. 1-6.*

Wu et al., Algorithm and Architecture Design of Image Inpainting Engine for Video Error Concealment Applications, 2011, IEEE, pp. 792-803.*

Feb. 22, 2016, Korean Office Action for related KR application No. 10-2014-0183394.

Martinez-Noriega, R. et al., "Exemplar-based image inpainting: Fast priority and coherent nearest neighbor search", Machine Learning for Signal Processing (MLSP), 2012 IEEE International Workshop on, Sep. 23-26, 2012.

\* cited by examiner

ERROR CONCEALMENT METHOD USING SPATIAL INTERPOLATION AND EXEMPLAR-BASED IMAGE INPAINTING

CROSS-REFERENCE TO RELATED APPLICATIONS

This application claims the benefit under 35 USC 119A of Korean Patent Application No. 10-2014-0183393 filed on Dec. 18, 2014, Korean Patent Application No. 10-2014-0183394 filed on Dec. 18, 2014 and Korean Patent Application No. 10-2014-0183395 filed on Dec. 18, 2014 in the Korean Intellectual Property Office, the entire disclosure of which is incorporated herein by reference for all purposes.

BACKGROUND

The following description relates to an error concealment method.

Most image coding techniques such as H.264, MPEG-4, and HEVC (H.265) use variable length coding and spatial and motion prediction methods.

In compressed images generated by using the methods, some of transmitted data may be lost in a communication environment. Accordingly, in order to minimize damage due to an error occurring in a communication channel, when the error occurs, an error concealment method has been researched.

The error concealment method is a method of maximally restoring damaged blocks by using information on adjacent blocks which are normally restored. The error concealment method is largely divided into a spatial error concealment (SEC) method and a temporal error concealment (TEC) method. The SEC method is a method of interpolating the damaged blocks by using pixel values of peripheral blocks which are correctly decoded on the assumption that there is no sudden change in brightness among adjacent pixels in a spatial area.

SUMMARY

In one general aspect, there is provided an error concealment method using spatial interpolation and exemplar-based image inpainting including: receiving an image including a source area and a restoration area to be restored by means of a decoder; determining a target patch in which a target pixel having the highest priority is at the center among pixels positioned in a boundary area of the restoration area by means of the decoder; and performing restoring by exemplar-based image inpainting for the target patch based on a difference between the target patch and the final source patch of the source area or performing spatial interpolation for the target pixel by means of the decoder.

In another general aspect, there is provided an error concealment method including: determining a target pixel having the highest priority among pixels positioned in a boundary area of a restoration area in an image including a source area and the restoration area to be restored by means of a decoder; and performing directional interpolation or neighbor interpolation by comparing a gradient amplitude of the target pixel and a threshold value by means of the decoder, wherein the threshold value is determined according to image complexity of the boundary area.

In yet another general aspect, there is provided an error concealment method for performing an error concealment using an exemplar-based image inpainting, the method including: determining a final source patch based on whether a target patch in which a pixel positioned in a boundary area of a restoration area is at the center is matched with a boundary of a candidate source patch positioned in the source area in an image including a source area and the restoration area to be restored and restoring the target patch by using the final source patch by means of a decoder.

BRIEF DESCRIPTION OF THE DRAWINGS

The above and other aspects, features and other advantages of the example will be more clearly understood from the following detailed description taken in conjunction with the accompanying drawings, in which.

Figure 1A:
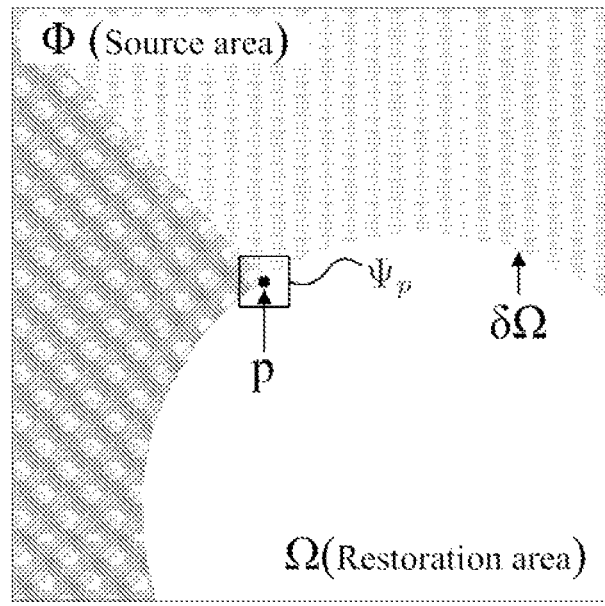
FIGS. 1A and 1B illustrate an example of an image which is inpainted.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The presently described examples will be understood by reference to the drawings, wherein like parts are designated by like numerals throughout. The drawings are not necessarily drawn to scale, and the size and relative sizes of the layers and regions may have been exaggerated for clarity.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the example. As used herein, the term "and/or" includes any and all combinations of one or more of the associated listed items.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before starting detailed explanations of figures, components that will be described in the specification are discriminated merely according to functions mainly performed by the components or conventionally carried out according to common knowledge of related technical fields. That is, two or more components which will be described later can be integrated into a single component. Furthermore, a single component which will be explained later can be separated into two or more components. Moreover, each component which will be described can additionally perform some or all of a function executed by another component in addition to the main function thereof. Some or all of the main function of each component which will be explained can be carried out by another component. Accordingly, presence/absence of each component which will be described throughout the specification should be functionally interpreted.

The following description relates to an error concealment method used by an apparatus (decoder) of receiving an image through a wireless network and the like and restoring the image. In more detail, the following description relates to a spatial interpolation method for spatial error concealment (SEC). The following description may be applied even to any case where the SEC is required in an image received by the decoder. For example, the following description may be applied even to a case where an error occurs in a received intra (I) frame.

The following description largely includes three restoring methods. (1) The first method is an error concealment method 200 applying exemplar-based inpainting. The image inpainting has been used as a method for restoring an image in which a specific portion is cut without relating an original error concealment method. In the exemplar-based inpainting of the image inpainting method, a patch having the highest priority is first restored by setting a patch based on each pixel with respect to each pixel placed on the boundary of the area to be restored and calculating a priority thereof. (2) The second method is an adaptive spatial interpolation method 300 using indirection information of the pixel. (3) The third method is an error concealment method 400 using the exemplar-based inpainting or the adaptive spatial interpolation. Hereinafter, the following description will be described in sequence.

1. Error Concealment Applying Exemplar-Based Image Inpainting

Exemplar-Based Image Inpainting

Figure 1B:
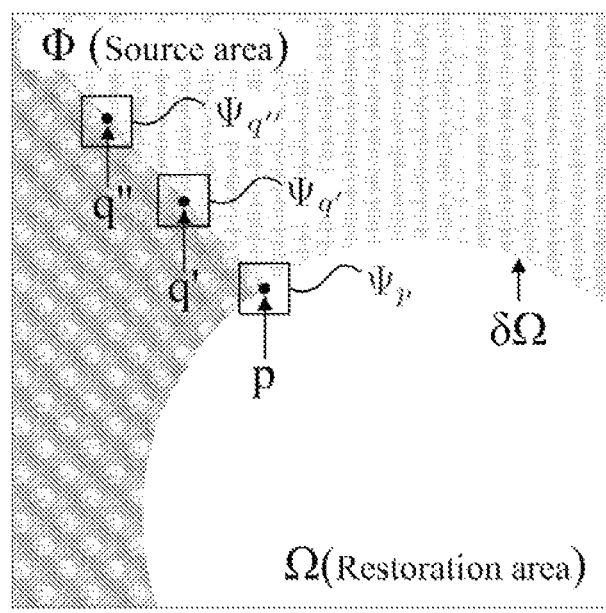

First, an exemplar-based image inpainting method will be described. FIG. 1 illustrates an example of an image which is inpainted. FIGS. 1A and 1B illustrate a source area Φ, a restoration area Ω, and a boundary area δΩ which borders the source area Φ in the restoration area Ω. The restoration area Ω means an area in which the image is damaged and thus needs to be restored and the source area Φ means an area which is not damaged. FIG. 1A illustrates an example of a target patch to be restored in the image. FIG. 1B illustrates an example of a target patch and a source patch using for restoring the target patch.

The decoder determines a target patch $\psi_p$ to be restored in the boundary area δΩ and finds a source patch $\psi_q$ to be used for restoring the corresponding patch in the source area Φ. Thereafter, the decoder restores the target patch by using the source patch. The decoder gradually performs restoration inward in the boundary area until the restoration area Ω is fully restored.

The decoder may determine a priority for the patch which is first restored in the restoration area Ω. The decoder may determine a restoring order for the patch according to the priority of the pixel included in the patch. The decoder may determine a pixel having the highest priority among pixels in the boundary area δΩ and first restore the patch including the corresponding pixel.

Like the following Equation 1, a priority P(p) for a pixel p in the restoration area Ω may be calculated by the product of confidence C(p) of the pixel p and a gradient function D(p) of the pixel p.

$$P(p)=C(p)D(p) \qquad \text{[Equation 1]}$$

C(p) is a ratio of confidential pixels in the entire pixels in the patch $\psi_p$. The confidential pixels mean pixels positioned in the remaining area except for the restoration area Ω in the area illustrated in FIG. 1. The following Equation 2 is an equation calculating C(p). D(p) corresponds to the strength of a gradient in p. The following Equation 3 is an equation calculating D(p).

$$C(p) = \frac{\sum_{q \in \Psi_p \cap (I-\Omega)} C(q)}{|\Psi_p|} \qquad \text{[Equation 2]}$$

In Equation 2, I means the entire area including the source area and the restoration area. I−Ω means an area except for the restoration area Ω in the entire area. $|\Psi_p|$ means the number of pixels of the target patch $\psi_p$. C (q) has a value of 1 if q is in the source area Φ and q has a value of 0 if q is in the restoration area Ω.

$$D(p) = \frac{|\nabla I_p^\perp \cdot n_p|}{\alpha} \qquad \text{[Equation 3]}$$

In Equation 3, $\nabla I_p^\perp$ is isophote of the pixel p. In Equation 3, $\nabla$ is a gradient operator and $\perp$ is an orthogonal operator. In Equation 3, $n_p$ is a normal vector for δΩ in the pixel p and α is a normalized parameter (255 in a gray-level image).

In summary, the decoder may determine the priority of the pixel p based on (i) how many confidential pixels are included in the patch to be restored and (ii) how much the gradient of the image is strong in a central pixel of the patch to be restored.

For convenience of description, in FIG. 1, it is assumed that p among the pixels in the restoration area Ω has the highest priority. Accordingly, in FIGS. 1A and 1B, $\Psi_p$ corresponds to the target patch. The target patch $\Psi_p$ is a patch area having the pixel P at the center. The patch means a basic unit in which restoring is performed in the image.

The decoder needs to determine the most similar source patch $\Psi_{\bar{q}}$ the target patch $\Psi_p$ in which p is included at the center in the source area $\psi$. Hereinafter, the most similar source patch $\Psi_{\bar{q}}$ is called the final source patch. The decoder determines which candidate source patch is the final source patch $\Psi_{\bar{q}}$ among at least one candidate source patch similar to the target patch $\Psi_p$ in the source area $\psi$.

In FIG. 1B, two candidate source patches are illustrated as an example. In FIG. 1B, a candidate source patch $\Psi_{q'}$ in which a pixel q' is at the center and a candidate source patch $\Psi_{q''}$ in which a pixel q" is at the center are illustrated.

The decoder may determine the final source patch $\Psi_{\hat{q}}$ by using an equation such as the following Equation 4.

$$\Psi_{\hat{q}} = \arg\min_{\Psi_{\hat{q}} \in \Phi} d(\Psi_{\hat{p}}, \Psi_{\hat{q}}), \quad [\text{Equation 4}]$$

In Equation 4, $\Psi_{\hat{p}}$ is an area positioned in the source area $\Phi$ in $\Psi_p$. That is, $\Psi_{\hat{p}} = \Psi_p \cap \Phi$. $\Psi_{\hat{q}}$ means an area having a shape such as $\Psi_{\hat{p}}$ in $\Psi_q$. $d(\Psi_{\hat{p}}, \Psi_{\hat{q}})$ is a sum of squared difference (SSD) of corresponding pixels in $\Psi_{\hat{p}}$ and $\Psi_{\hat{q}}$. For example, in FIG. 1B, the candidate source patch $\Psi_{q'}$ has a smaller SSD value than that of $\Psi_{q''}$, the decoder determines $\Psi_{q'}$ as the final source patch $\Psi_{\hat{q}}$. Thereafter, the decoder restores the target patch $\Psi_p$ based on the final source patch $\Psi_{\hat{q}}$.

Meanwhile, the decoder may use another value other than the aforementioned SSD in order to find the final source patch $\Psi_{\hat{q}}$. The decoder may search the final source patch $\Psi_{\hat{q}}$ based on a mean-squared error (MSE) and a side matching distortion (SMD). The related description will be described.

An area positioned in the restoration area $\Omega$ in the target patch $\Psi_p$ is called $\Psi_{\tilde{p}}$. An area corresponding to $\Psi_{\tilde{p}}$ in the source patch is called $\Psi_{\tilde{q}}$. The decoder may perform inpainting by replacing $\Psi_{\tilde{p}}$ with $\Psi_{\tilde{q}}$.

The decoder may determine the final source patch for a target patch having a next priority and restore the target patch having the next priority. As such, the decoder may determine the source patch of the source area $\Phi$ with respect to all the target patches in the restoration area $\Omega$ and restore the target patch by a method of attaching the determined source patch to the corresponding target patch.

Method of Determining Source Patch

Figure 2:
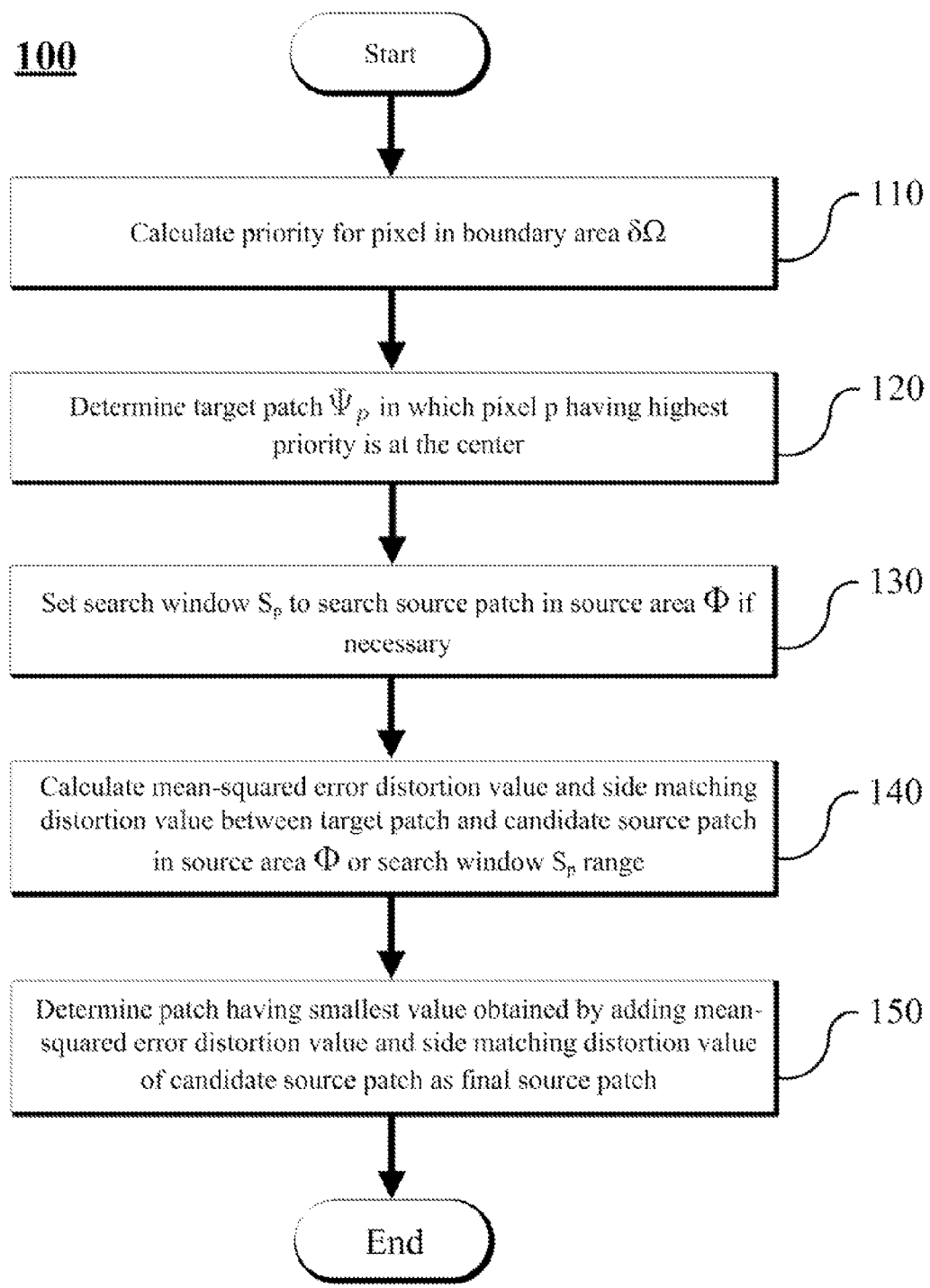
FIG. 2 illustrates an example of a flowchart for a method of determining a source patch for restoring a target patch.

FIG. 2 illustrates an example of a flowchart for a method 100 of determining a source patch for restoring a target patch.

In a method 100 of determining the source patch, the decoder first calculates a priority for a pixel which belongs to the boundary area $\delta\Omega$ of the restoration area $\Omega$ (110). The priority may be determined by using the aforementioned Equation 1. The decoder determines the pixel p having the highest priority among pixels included in the boundary area $\delta\Omega$ and determines the target patch $\Psi_p$ in which the pixel p is at the center (120).

Thereafter, the decoder searches the source patch for using the target patch $\Psi_p$ for restoring. Meanwhile, the decoder may search the source patch by limiting a partial area other than the entire source area $\Phi$. In this case, the decoder may set a search window $S_p$ to search the source patch (130).

Setting of Area for Searching Source Patch

The decoder searches the source patch $\Psi_q$ corresponding to the target patch $\Psi_p$ in the source area $\Phi$. The decoder may uniformly limit an area for searching the source patch. In order to limit the area for searching the source patch, the decoder may use a search window having a finite size. The decoder may limit a range of the search window for finding the source patch by using the following Equation 5.

$$S_p = \{(u,v) | u \in [x-s, x+s], v \in [y-s, y+s]\} \quad [\text{Equation 5}]$$

In Equation 5, p is a pixel having the highest priority determined by Equation 1, (x, y) is a coordinate of p, and $S_p$ is a search area having a size of $(2s+1) \times (2s+1)$. The searching may be performed only in $S_p$. s is a parameter for setting the size of the search area. S may use an appropriate value according to a size of the search area.

The decoder searches the source patch in the entire source area $\Phi$ or a predetermined search window $S_p$ as described above. The decoder calculates a mean-squared error (MSE) distortion value and a side matching distortion (SMD) value between the target patch $\Psi_p$ and the candidate source patch (for example, $\Psi_{q'}$ and $\Psi_{q''}$ in FIG. 1B) in the search range (140).

Finally, the decoder determines a patch having the smallest value obtained by adding the MSE distortion value and the SMD value among the candidate source patches as the final source patch $\Psi_{\hat{q}}$ (150). Hereinafter, a process of determining the final source patch will be described in detail.

FIG. 3 illustrates an example for describing an area of the target patch and the source patch. In FIG. 3, the patch has a grid shape including a plurality of squares. In FIG. 3, one square configuring the grid corresponds to one pixel.

Figure 3A:
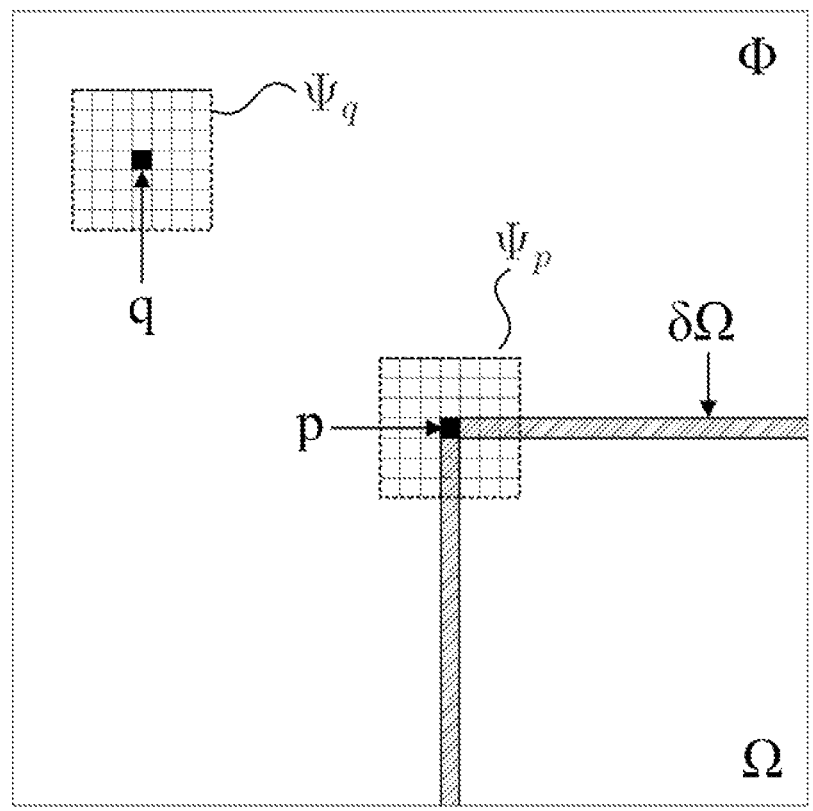
FIGS. 3A through 3C illustrate an example for describing an area of the target patch and the source patch.

FIG. 3A illustrates an example of an area including the restoration area $\Omega$ and the source area $\Phi$ as illustrated in FIG. 1. In FIG. 3A, the restoration area $\Omega$ having the square shape is illustrated at the lower right side and the remaining area of FIG. 3A corresponds to the source area $\Phi$. In FIG. 3A, the restoration area $\Omega$ includes the boundary area $\delta\Omega$ contacting the source area $\Phi$. The boundary area $\delta\Omega$ is constituted by pixels outside the restoration area $\Omega$.

FIG. 3A illustrates the target patch $\Psi_p$ in which one pixel p positioned in the boundary area $\delta\Omega$ is at the center. It is assumed that the pixel p currently has the highest priority among the pixels in the boundary area $\delta\Omega$. The upper left side of FIG. 3A illustrates one source patch $\Psi_q$ in which the pixel q is at the center in the source area $\Phi$. The source patch $\Psi_q$ illustrated in FIG. 3A corresponds to one candidate source patch. Hereinafter, a process of determining the most appropriate final source patch $\Psi_{\hat{q}}$ by comparing the target patch $\Psi_p$ and the source patch $\Psi_q$ will be described.

The method of determining the source patch described below is used based on the MSE and the SMD. The SMD is used in a boundary matching algorithm (BMA) of H.264. The existing SMD is used in a regular boundary, but the SMD will be used even in an irregular boundary in the following description.

First, a specific area which is a parameter used in the MSE distortion operation and the SMD operation to be described below will be described.

Figure 3B:
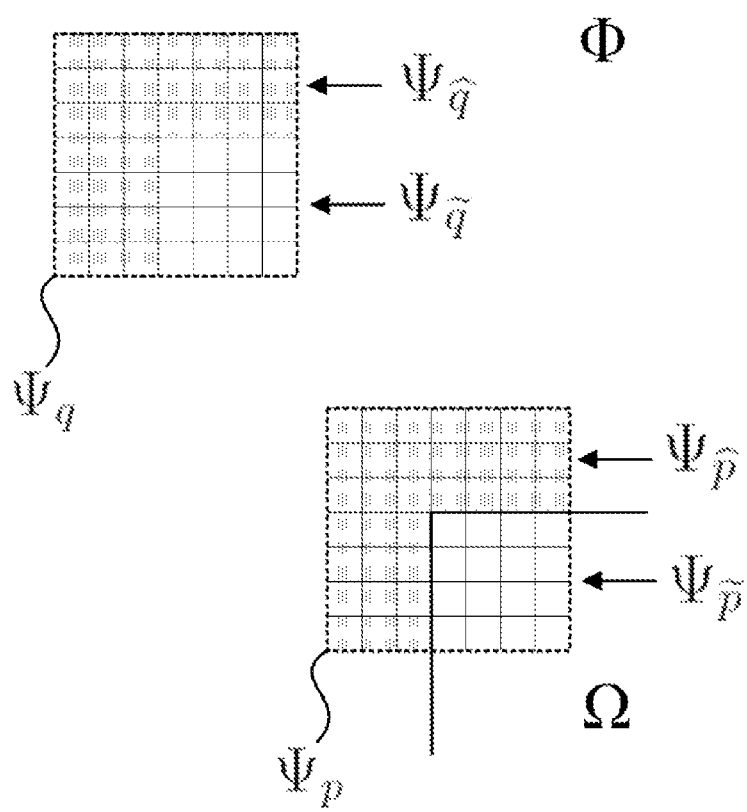

FIG. 3B is an example illustrating the target patch $\Psi_p$ and the source patch $\Psi_q$ in FIG. 3A. In FIG. 3B, an area positioned in the source area $\Phi$ of the target patch $\Psi_p$ area is represented as $\Psi_{\hat{p}}$ and an area corresponding to $\Psi_{\hat{p}}$ in the source patch $\Psi_q$ is represented as $\Psi_{\hat{q}}$. In FIG. 3B, $\Psi_{\hat{p}}$ and $\Psi_{\hat{q}}$ are represented by the shadow. In FIG. 3B, an area positioned in the restoration area $\Omega$ of the target patch $\Psi_p$ area is represented as $\Psi_{\tilde{p}}$ and an area corresponding to $\Psi_{\tilde{p}}$ in the source patch $\Psi_q$ is represented as $\Psi_{\tilde{q}}$.

Figure 3C:
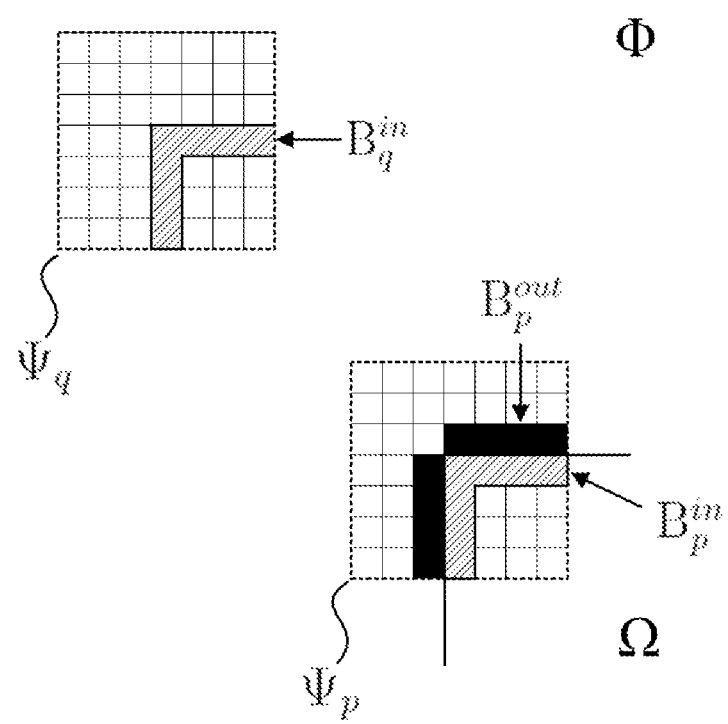

FIG. 3C is another example illustrating the target patch $\Psi_p$ and the source patch $\Psi_q$ in FIG. 3A. In FIG. 3C, an inner boundary area positioned in the restoration area $\Omega$ at the target patch $\Psi_p$ is represented as $B_p^{in}$. In FIG. 3C, an area corresponding to $B_p^{in}$ in the source patch $\Psi_q$ is represented as $B_q^{in}$. $B_p^{in}$ corresponds to the area which belongs to the target patch $\Psi_p$ in the boundary area $\delta\Omega$. In FIG. 3C, $B_p^{in}$ and $B_q^{in}$ are represented by a dashed line. Meanwhile, in FIG. 3C, the boundary which borders the target patch $\Psi_p$ in the source area $\Phi$ is represented as $B_p^{out}$. $B_p^{out}$ may be referred to as an outer boundary area of the target patch $\Psi_p$.

The MSE distortion value $d_{mse}$ may be defined as the following Equation 6.

$$d_{mse} = \frac{1}{N}\sum_{n=1}^{N}(\Psi_{\hat{p}}(n) - \Psi_{\hat{q}}(n))^2 \qquad \text{[Equation 6]}$$

In Equation 6, $\Psi_{\hat{p}}$ is an area positioned in the source area $\Phi$ in the target patch $\Psi_p$ and $\Psi_{\hat{q}}$ is an area corresponding to $\Psi_{\hat{p}}$ in the source patch $\Psi_q$. That is, $\Psi_{\hat{q}}$ has the same shape as $\Psi_{\hat{p}}$. In Equation 6, N is the number of pixels of $\Psi_{\hat{p}}$. In Equation 6, $\Psi_{\hat{p}}(n)$ and $\Psi_{\hat{q}}(n)$ are gray levels for n-th pixels of $\Psi_{\hat{p}}$ and $\Psi_{\hat{q}}$, respectively.

The SMD $d_{smd}$ may be defined as the following Equation 6.

$$d_{smd} = \frac{1}{K}\sum_{k=1}^{K}(B_p^{out}(k) - B_q^{in}(k))^2 \qquad \text{[Equation 7]}$$

In Equation 7, $B_p^{in}$ is an inner boundary area which belongs to the restoration area $\Omega$ in the target patch $\Psi_p$ as described in FIG. 3C. In Equation 7, $B_p^{out}$ is an outer boundary area positioned outside the restoration area $\Omega$ in the target patch $\Psi_p$. In other words, $B_p^{out}$ is an area which belongs to the source area $\Phi$ in the target patch $\Psi_p$ and contacts the inner boundary area. $B_q^{in}$ is an area corresponding to $B_p^{in}$ in the source patch $\Psi_q$. In addition, K is the number of pixels of $B_p^{out}$.

As described above, the decoder may perform an operation of finding the source patch for restoring the target patch through the aforementioned Equation 4. The decoder may search the source patch by using $d_{mse}$ and $d_{smd}$ instead of the SSD value. The decoder may calculate a target patch distortion value $d(\Psi_p, \Psi_q)$ as the following Equation 8 by using $d_{mse}$ and $d_{smd}$.

$$d(\Psi_p, \Psi_q) = \alpha \cdot d_{mse} + (1-\alpha)\beta \cdot d_{smd} \qquad \text{[Equation 8]}$$

In Equation 8, $\alpha$ may be calculated as the following Equation 9 as a weighting factor. In Equation 8, $\beta$ has a value of $0 \leq \beta \leq 3$ as a weighting factor for the SMD. When $\beta$ is set as 1, a weight is determined in proportion to the number of pixels used in $d_{mse}$ and $d_{smd}$, and when $\beta$ is set as 0, $d_{smd}$ is not influenced.

$$\alpha = \frac{N}{N+K} \qquad \text{[Equation 9]}$$

In Equation 9, N is the number of pixels of $\Psi_{\hat{p}}$ used in the $d_{mse}$ calculation and K is the number of pixels of $B_p^{out}$ used in the $d_{smd}$ calculation.

In the case of a color image having three color components such as RGB, the target patch distortion value $d(\Psi_p, \Psi_q)$ becomes a value obtained by adding the target patch distortion value to each color component as the following Equation 10.

$$d(\Psi_p, \Psi_q) = \sum_{c=1}^{3} d^c(\Psi_p, \Psi_q) \qquad \text{[Equation 10]}$$

In Equation 10, $d^c(\Psi_p, \Psi_q)$ means the target patch distortion value for the c-th color component among a plurality of color components.

The decoder determines the final source patch $\Psi_{\bar{q}}$ for the target patch $\Psi_p$ finally using the target patch distortion value $d(\Psi_p, \Psi_q)$ calculated based on $d_{mse}$ and $d_{smd}$. The following Equation 11 corresponds to an equation for determining the final source patch $\Psi_{\bar{q}}$.

$$\Psi_{\bar{q}} = \underset{q \in S_p}{\arg\min}\, d(\Psi_p, \Psi_q) \qquad \text{[Equation 11]}$$

In Equation 11, $S_p$ corresponds to the search area. The search area may be the entire source area $\Phi$, but may also be a search area limiting the range as described in Equation 5. The decoder calculates the target patch distortion value $d(\Psi_p, \Psi_q)$ for the pixel p existing in $S_p$ and selects a patch having the smallest target patch distortion value as the final source patch $\Psi_{\bar{q}}$.

Error Concealment Method

Figure 4:
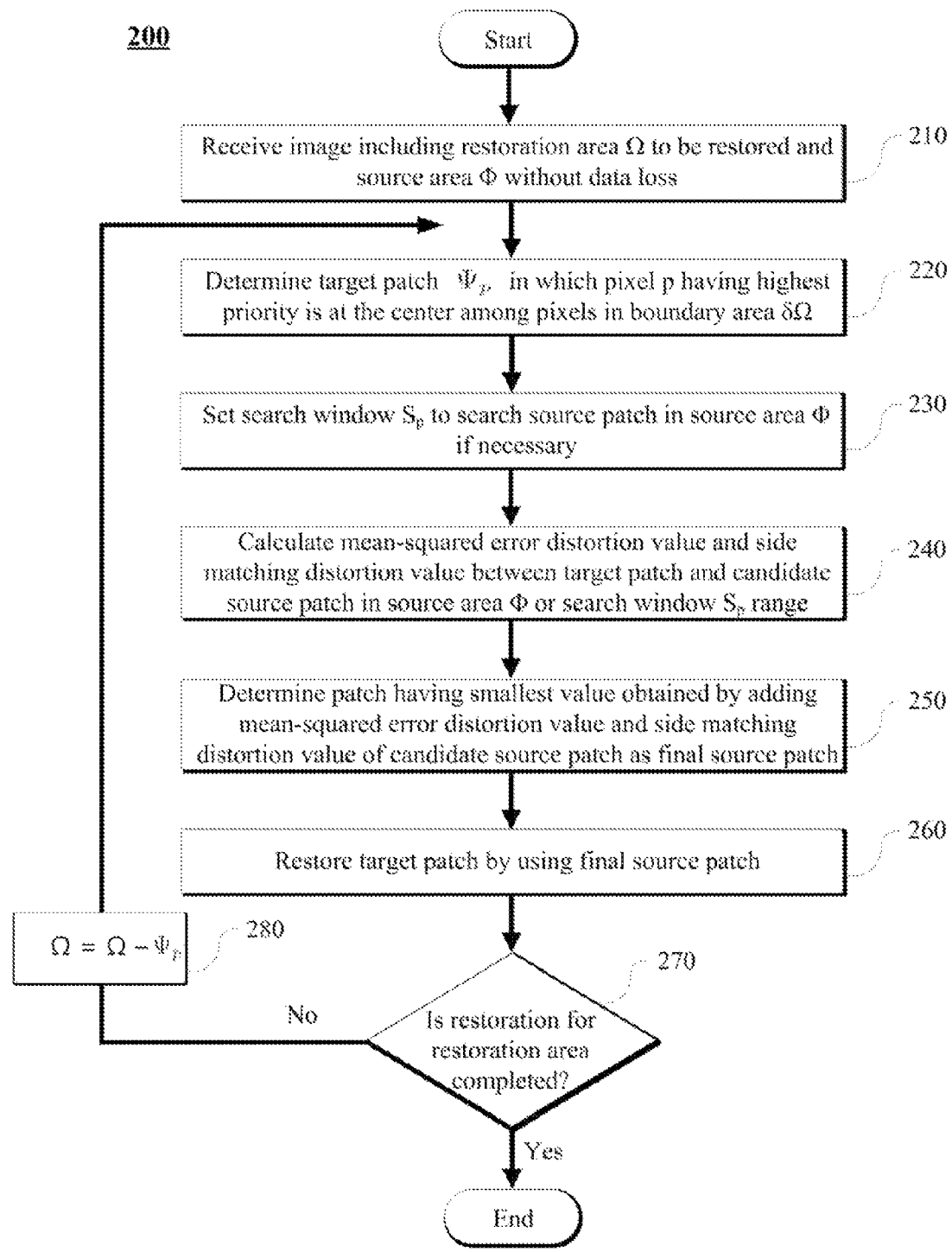
FIG. 4 illustrates an example of a flowchart for an error concealment method using exemplar-based image inpainting.

FIG. 4 illustrates an example of a flowchart for an error concealment method 200 using exemplar-based image inpainting. The error concealment method 200 uses exemplar-based image inpainting based on the aforementioned method 100 of determining the source patch.

The decoder first receives an image including a restoration area $\Omega$ to be restored and a source area $\Phi$ without data loss (210). Thereafter, the final source patch is determined through the aforementioned method 100 of determining the source patch.

The decoder determines a target patch $\Psi_p$ in which a pixel p having the highest priority is at the center among pixels of the boundary area $\delta\Omega$ (220). The decoder may set the search window $S_p$ if necessary (230). When the decoder sets the search window $S_p$, the decoder calculates an MSE distortion value and a SMD value between a candidate source patch $\Psi_q$ and a target patch $\Psi_p$ which exist in the search window $S_p$ (240).

When the decoder does not set the search window $S_p$, the decoder calculates an MSE distortion value $d_{mse}$ and a SMD value $d_{smd}$ between a candidate source patch $\Psi_q$ and a target patch $\Psi_p$ which exist in the source area $\Phi$ (240).

The decoder determines a patch having the smallest value obtained by adding the MSE distortion value $d_{mse}$ and the SMD value $d_{smd}$ among the candidate source patches as the final source patch $\Psi_{\bar{q}}$ (250). In the process 250, the MSE distortion value and the SMD value may use the weight described in Equation 8.

The decoder restores the target patch $\Psi_p$ by using the final source patch $\Psi_{\bar{q}}$ (260). In this process, the decoder may replace the $\Psi_{\hat{p}}$ area of the target patch $\Psi_p$ with the $\Psi_{\hat{q}}$ area of the final source patch $\Psi_{\bar{q}}$.

The decoder determines whether restoration for the restoration area $\Omega$ is completed (270). When the restoration is not completed, the decoder performs the restoration for the remaining restoration area. The decoder restores the corresponding target patch by determining the next target patch in the restoration area $\Omega$. In order to the next target patch, the decoder excludes the target patch $\Psi_p$ just restored in the restoration area $\Omega$. (280), determines the pixel p having a high priority in the remaining area, and determines the next target patch $\Psi_p$ (220). Thereafter, the decoder repeats the processes 230 to 270.

2. Adaptive Spatial Interpolation Method

Figure 5:
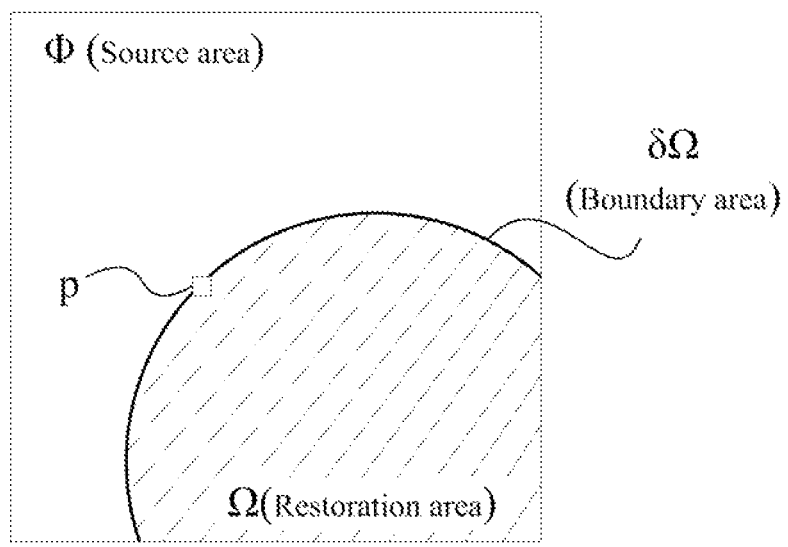
FIG. 5 illustrates an example of an image in which spatial interpolation is required.

An adaptive spatial interpolation method corresponding to the second error concealment method will be described. FIG. 5 illustrates an example of an image in which spatial interpolation is required. The image of FIG. 5 includes a source area Φ, a restoration area Ω, and a boundary area δΩ which borders the source area Φ in the restoration area Ω. The source area Φ means an area in which restoration is not required in the received image and the restoration area Ω means an area in which the restoration is required in the received image. That is, the restoration area Ω is an area in which an error occurs in an image data delivery process and thus accurate data are not received. Hereinafter, a spatial interpolation method for the restoration area Ω will be described.

Figure 6:
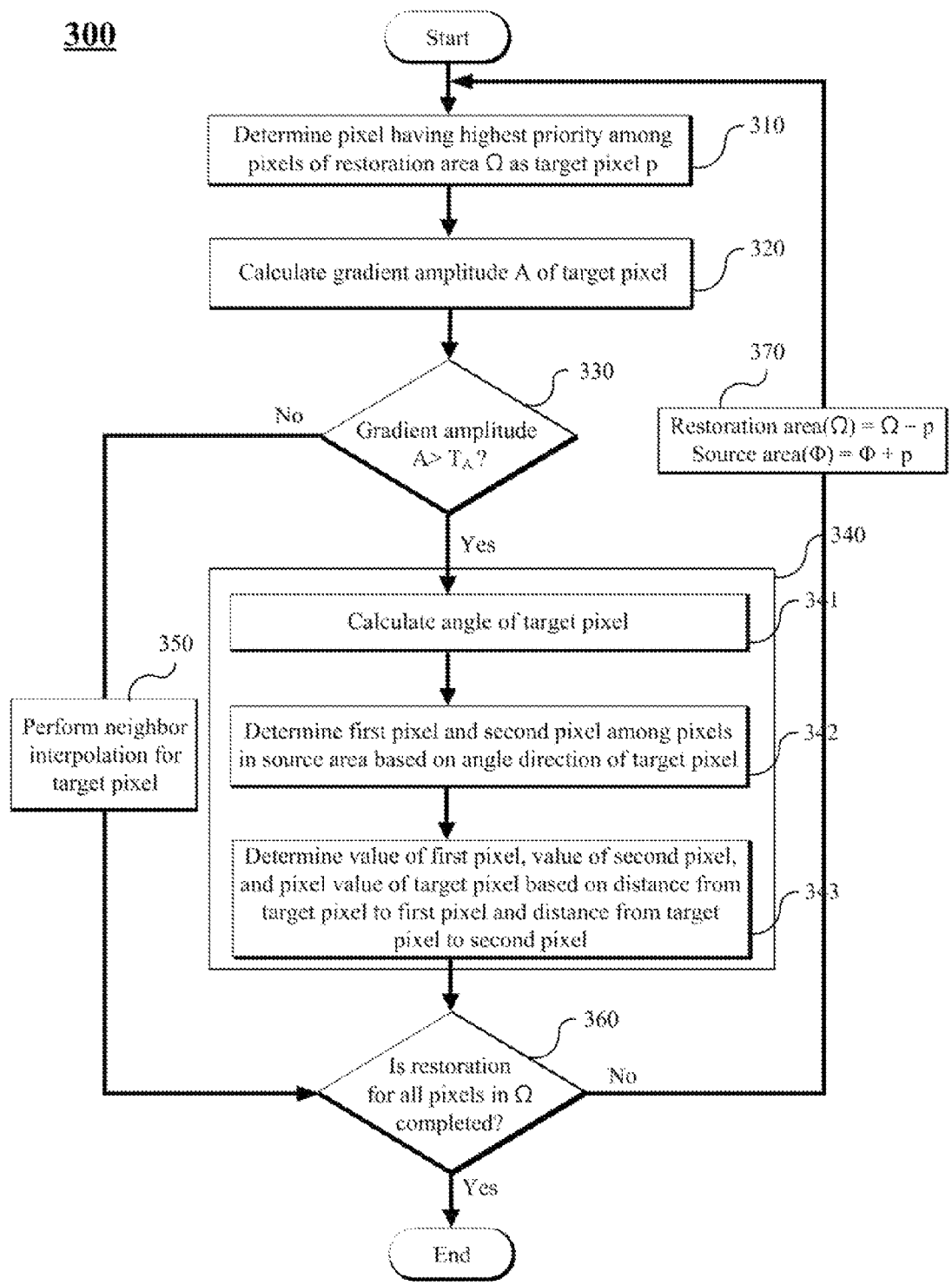
FIG. 6 illustrates an example of a flowchart for an adaptive spatial interpolation method.

FIG. 6 illustrates an example of a flowchart for an adaptive spatial interpolation method 300.

The decoder determines a target pixel to be restored among pixels in the restoration area Ω (310). The decoder determines priorities for the pixels in the restoration area Ω and may determine a pixel having the highest priority as the target pixel. The priority for the pixel may be determined by using the aforementioned Equation 1.

The decoder calculates a gradient amplitude A of the determined target pixel. The gradient amplitude of the pixel may be calculated by using the following Equation 12. Equation 12 is a gradient amplitude of a pixel having a coordinate (x, y).

$$A(x,y)=\sqrt{G_h^2(x,y)+G_v^2(x,y)}$$ [Equation 12]

In Equation 12, $G_h(x,y)$ is a horizontal gradient component of the target pixel and $G_v(x,y)$ is a vertical gradient component of the target pixel. When the received image is a color image, the final gradient amplitude becomes a value obtained by adding a value obtained by calculating Equation 12 to each color component of the target pixel.

Thereafter, the decoder compares the gradient amplitude A of the target pixel and a threshold value $T_A$ (330). When the gradient amplitude A of the target pixel is equal to or smaller than the threshold value $T_A$, the decoder performs neighbor interpolation for the target pixel (350). When the gradient amplitude A of the target pixel is larger than the threshold value $T_A$, the decoder performs directional interpolation for the target pixel (340). The threshold value $T_A$ may be calculated by the following Equation 13.

$$T_A = m_A - \frac{\sigma_A}{2}$$ [Equation 13]

In Equation 13, $m_A$ is an average of a gradient amplitude A(x,y) for the pixels in the boundary area δΩ and $\sigma_A$ is a standard deviation of the gradient amplitude A(x,y) for the pixels in the boundary area δΩ. That is, complexity of the boundary area influences the threshold value.

When the gradient amplitude of the pixel is larger than the threshold value $T_A$, the corresponding pixel is classified as an edge pixel. When the gradient amplitude of the pixel is equal to or smaller than the threshold value $T_A$, the corresponding pixel is classified as a homogeneous pixel. As a result, the decoder performs the directional interpolation for the edge pixel and the neighbor interpolation for the homogeneous pixel.

Directional Interpolation

Directional interpolation 340 will be described.

A directional interpolation process 340 includes calculating an angle of the target pixel (341), determining the closest pixels (a first pixel and a second pixel) to the target pixel p among pixels in the source area Φ based on the calculated angle direction (342), and determining a value of the target pixel p based on the determined first pixel and second pixel (343).

The angle θ(x,y) of the target pixel p represents directionality of the target pixel p and is calculated by the following Equation 14 with respect to p which is the edge pixel. It is assumed that p has a coordinate (x, y).

$$\theta(x,y)=\arctan(G_v/G_h)$$ [Equation 14]

In Equation 14, $G_h$ is a horizontal gradient component of the pixel and $G_c$ is a vertical gradient component of the pixel. The angle θ(x,y) of the target pixel p has a value of 0 to π. The calculated angle θ(x,y) of the pixel may be uniformly quantized.

Figure 7:
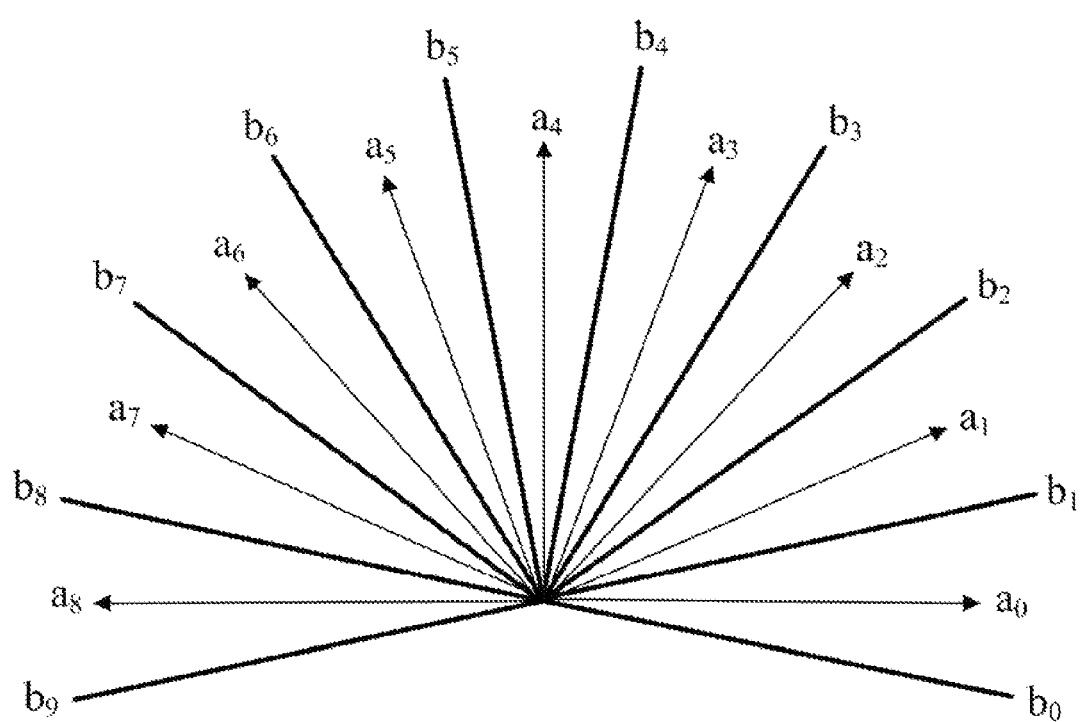
FIG. 7 illustrates an example of a reference for quantizing an angle of a target pixel.

FIG. 7 illustrates an example of a reference for quantizing an angle of a target pixel. In FIG. 7, each straight line may be expressed by the following Equation 15.

$$a_i = \frac{2i}{16}\pi, b_i = \frac{2i-1}{16}\pi$$ [Equation 15]

In FIG. 7, $b_i$ corresponds to a reference line for determining the angle of the pixel and $a_i$ means angle for quantizing the angle in a predetermined range. For example, when the calculated result θ(x,y) of Equation 14 has a value between $b_i$ and $b_{i+1}$, the decoder determines a final angle of the pixel as $a_i$.

Figure 8A:
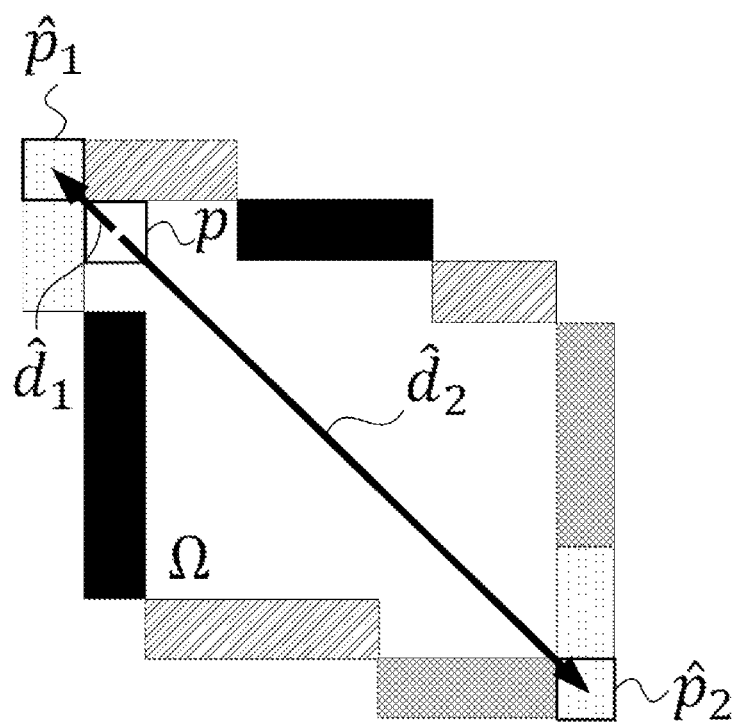
FIGS. 8A and 8B illustrate an example of performing directional interpolation for the target pixel.
Figure 8B:
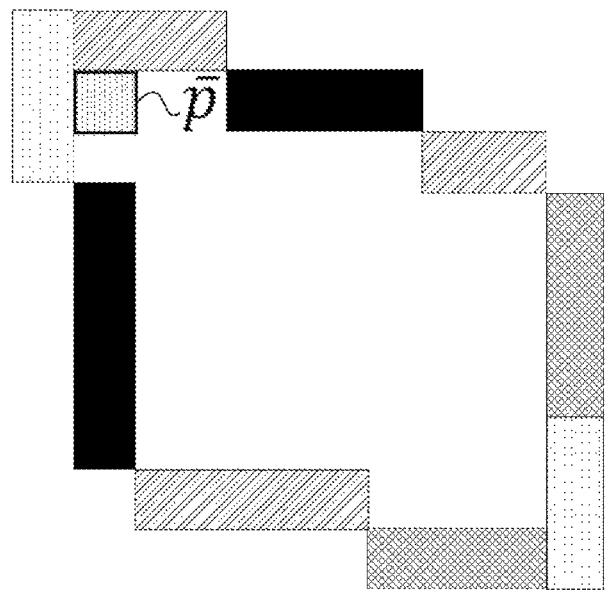

FIG. 8 illustrates an example of performing directional interpolation for the target pixel p. FIG. 8A is an example for a process of determining a pixel in the source area Φ for performing directional interpolation based on the target pixel p. FIG. 8B is an example illustrating a result in which the target pixel p is interpolated. In FIG. 8, a white area at the center is the restoration area Ω. In FIG. 8, a block expressed by a black color, an oblique line, or a regular pattern represents a part of the source area Φ. It is assumed that the angle (quantized result) of the pixel p is $a_6$.

FIG. 8A illustrates the target pixel p in the restoration area Ω and two pixels $\hat{p}_1$ and $\hat{p}_2$ in the source area Φ. $\hat{p}_1$ is called a first pixel and $\hat{p}_2$ is called a second pixel.

$\hat{p}_1$ is the closest pixel which meets in the source area Φ while moving in a direction 3π/4 of the angle $a_6$ in the target pixel p. $\hat{p}_2$ is the closest pixel which meets in the source area Φ while moving in an opposite direction −π/4 of the angle $a_6$ in the target pixel p. The decoder may use an algorithm of finding the first pixel $\hat{p}_1$ and the second pixel $\hat{p}_2$ based on the target pixel p as various heuristic methods.

Thereafter, the decoder calculates distances from the target pixel p to the first pixel $\hat{p}_1$ and the second pixel $\hat{p}_2$, respectively. The distance calculation of the pixel is performed through the following Equation 5. A distance from the target pixel p to the first pixel $\hat{p}_1$ is called a first distance $\hat{d}_1$ and a distance from the target pixel p to the second pixel $\hat{p}_2$ is called a second distance $\hat{d}_2$.

When a coordinate of the pixel $\hat{p}_i$ positioned in the source area is $(\hat{x}_i,\hat{y}_i)$ and a coordinate of the target pixel p is (x, y), the distance from the target pixel p to $\hat{p}_i$ is as the following Equation 16.

$$\hat{d}_i=\sqrt{(\hat{x}_i-x)^2+(\hat{y}_i-y)^2}$$ [Equation 16]

The decoder calculates the pixel value $\bar{p}$ for the target pixel p by using a distances from the first pixel value and the second pixel value to each pixel. The decoder may calculate the pixel value $\bar{p}$ for the target pixel p by using the following Equation 17. As a result, the target pixel p has $\bar{p}$ which is an interpolated value. FIG. 8B illustrates an example in which the target pixel p has the interpolated value $\bar{p}$.

$$\bar{p} = \frac{\sum_{i=1}^{2} \hat{p}_i(\hat{D}-\hat{d}_i)}{\sum_{i=1}^{2}(\hat{D}-\hat{d}_i)} = \frac{\hat{p}_1\hat{d}_2 + \hat{p}_2\hat{d}_1}{\hat{d}_1+\hat{d}_2} \qquad \text{[Equation 17]}$$

In Equation 17, $\hat{D}$ is a value obtained by adding $\hat{d}_1$ and $\hat{d}_2$.

Neighbor Interpolation

Figure 9A:
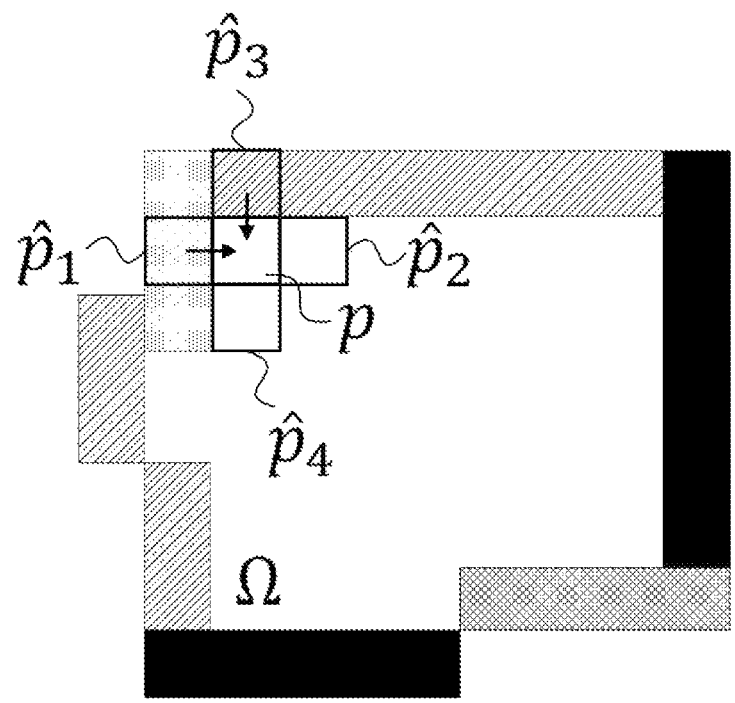
FIGS. 9A and 9B illustrate an example of performing neighbor interpolation for the target pixel.
Figure 9B:
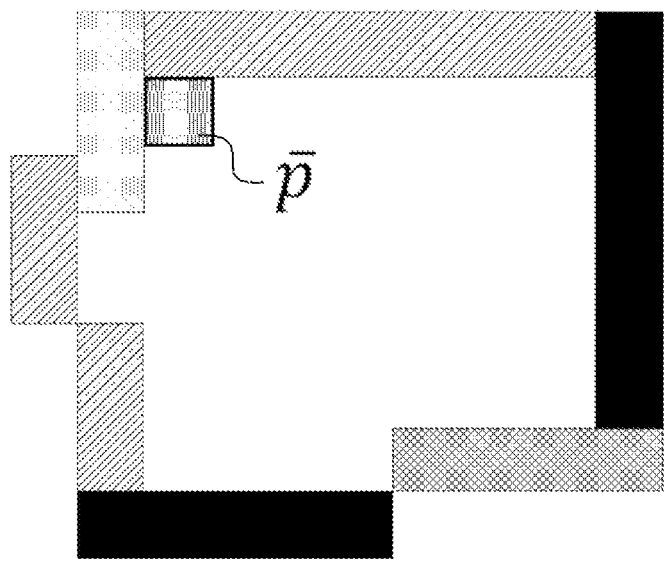

Hereinafter, in FIG. 6, a neighbor interpolation process (350) for the homogeneous pixel will be described. FIG. 9 illustrates an example of performing neighbor interpolation for the target pixel p. FIG. 9A is an example illustrating pixels in the source area Φ for performing neighbor interpolation based on the target pixel p and FIG. 9B is an example illustrating a result in which the target pixel p is interpolated. In FIG. 9, a white area at the center is the restoration area Ω. In FIG. 9, a block expressed by a black color, an oblique line, or a regular pattern represents a part of the source area Φ.

The neighbor interpolation is an interpolation method using a pixel adjacent to the target pixel p. For example, the neighbor interpolation may use a neighboring pixel adjacent to the target pixel p as illustrated in FIG. 9A. FIG. 9A illustrates neighboring pixels $\hat{p}_3$, $\hat{p}_4$, $\hat{p}_1$, and $\hat{p}_2$ positioned at the top, the bottom, the left side, and the right side of the target pixel p, respectively. The pixel value $\bar{p}$ of the target pixel p may be determined as an average of values of neighboring pixels of the target pixel p among the pixels in the source area Φ.

In FIG. 9A, pixels adjacent to the target pixel p in the source area Φ are $\hat{p}_1$ and $\hat{p}_3$. Accordingly, the pixel value $\bar{p}$ of the target pixel p becomes an average of the pixel value of $\hat{p}_1$ and the pixel value of $\hat{p}_3$. FIG. 9B illustrates an example in which the target pixel p has the pixel value $\bar{p}$ interpolated through neighbor interpolation.

Referring back to FIG. 6, after the directional interpolation (340) or the neighbor interpolation (350) for the target pixel is completed, the decoder determines whether restoring for the entire restoration area Ω is completed. When the restoring for the entire restoration area Ω is not completed, the process of FIG. 6 is repeated again. In this case, the restoration area Ω becomes an area except for the target pixel p in the existing restoration area Ω and the source area Φ becomes an area of adding the target pixel p to the existing source area Φ.

After interpolation for the previous target pixel is completed, the decoder determines the next target pixel and repeats the process of FIG. 6. As described above, the decoder may determine the next target pixel as the pixel having the highest priority among the pixels in the restoration area Ω except for the previous target pixel. Meanwhile, the decoder may determine the next target pixel as the pixel (that is, a pixel adjacent to the target pixel interpolated by a predetermined reference) positioned around the interpolated target pixel.

3. Error Concealment Method Using Spatial Interpolation and Exemplar-Based Image Inpainting Finally, the third error concealment method will be described. The third method is an error concealment method based on the error concealment method 200 and the adaptive spatial interpolation method 300 using the aforementioned exemplar-based image inpainting.

Figure 10:
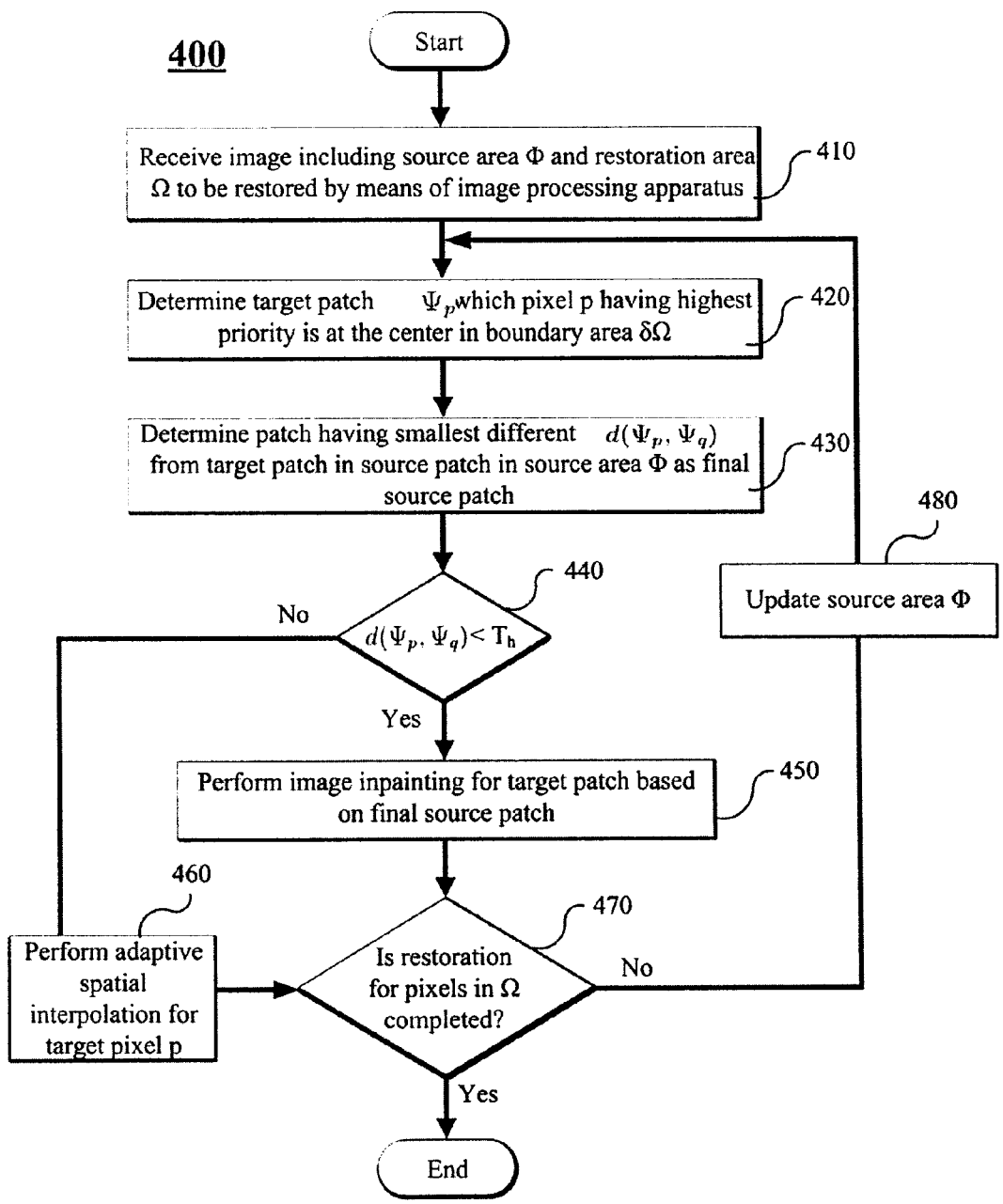
FIG. 10 illustrates an example of a flowchart for an error concealment method using spatial interpolation and exemplar-based image inpainting.

FIG. 10 illustrates an example of a flowchart for an error concealment method using spatial interpolation and exemplar-based image inpainting. The decoder receives an image including the source area Φ and the restoration area Ω to be restored.

The decoder determines a target patch having the highest priority in the boundary area δΩ like the aforementioned exemplar-based image inpainting. That is, the decoder determines a pixel (a target pixel) having the highest priority in the boundary area δΩ by using Equation 1. As described above, the target patch is a patch in which the target pixel is at the center. The decoder determines the target patch in which the target pixel having the highest priority is at the center among the pixels positioned in the boundary area δΩ (420). This process is the same as the aforementioned process 220 in FIG. 4.

Thereafter, the decoder determines a patch having the smallest difference from the target patch among candidate source patches in the source area Φ as the final source patch (430). This process is the same as the aforementioned process 250 in FIG. 4. A target patch distortion value $d(\Psi_p,\Psi_q)$ calculated in Equation 8 may be used to determine the final source patch. $d(\Psi_p,\Psi_q)$ means the difference between the target patch and the final source patch.

The decoder compares a threshold value $T_h$ and the target patch distortion value $d(\Psi_p,\Psi_q)$ for the final source patch. The decoder compares the target patch distortion value $d(\Psi_p,\Psi_q)$ and the threshold value $T_h$ as the following Equation 18 to determine whether the exemplar-based image inpainting or the adaptive spatial interpolation is performed with respect to the target patch.

$$\text{If } d(\Psi_p,\Psi_q) < T_h \, \Psi_{\bar{p}} = \Psi_{\bar{q}} // \text{Image inpainting(patch)}$$

$$\text{Else } p = \bar{p} // \text{Spatial interpolation(pixel)} \qquad \text{[Equation 18]}$$

When $d(\Psi_p,\Psi_q)$ is smaller than the threshold value $T_h$, the decoder performs the image inpainting for the target patch $\Psi_p$ by using the final source patch (450). The process 450 corresponds to the error concealment method 200 using the exemplar-based image inpainting of FIG. 4.

When $d(\Psi_p,\Psi_q)$ is equal to or larger than the threshold value $T_h$, the decoder performs the adaptive spatial interpolation for the target pixel p (460). The decoder determines that an appropriate source patch enough to restore the target patch $\Psi_p$ does not exist. The process 460 corresponds to the adaptive spatial interpolation method 300 of FIG. 6 described above.

When the target pixel is positioned at an edge of a complicated image, the target patch distortion value $d(\Psi_p, \Psi_q)$ is increased and when the target pixel is in the homogeneous image area, the target patch distortion value $d(\Psi_p, \Psi_q)$ has a small value. Accordingly, it is preferred that the threshold value $T_h$ is determined based on complexity of the target patch.

The complexity of the target patch may be determined by calculating the gradient amplitude for the $\Psi_{\hat{p}}$ area like the following Equation 19.

$$A_m = \frac{1}{N} \sum_{(x,y)\in \Psi_{\hat{p}}} A(x,y) \qquad \text{[Equation 19]}$$

Equation 19 is an average of values obtained by adding gradient amplitude to the pixels which belong to $\Psi_{\hat{p}}$ included in the source area Φ in the target patch. Here, N is the number of pixels of $\Psi_{\hat{p}}$.

The threshold value $T_h$ may be set in proportion to $A_m$. For example, the threshold value $T_h$ may also be adaptively set like the following Equation 20.

$$T_h = \begin{cases} T_{min}, & \text{for } A_m < T_{min} \\ A_m, & \text{for } T_{min} \leq A_m \leq T_{max} \\ T_{max}, & \text{for } A_m > T_{max} \end{cases} \quad \text{[Equation 20]}$$

In Equation 20, $T_{min}$ is a lower threshold value used for adaptively setting the threshold value $T_h$. $T_{max}$ is an upper threshold value used for adaptively setting the threshold value $T_h$.

The decoder determines whether restoring is completed in all the pixels in the restoration area Ω (470). When the restoration area Ω to be restored remains, the source area Φ is updated (480), and the process of FIG. 10 is repeated again.

The decoder adds the corresponding target pixel to the corresponding source area Φ when performing the adaptive spatial interpolation just before the source area Φ is updated. Alternatively, when the image inpainting is performed just before (450), the decoder adds the corresponding target patch $\Psi_p$ to the source area Φ. On the contrary, the decoder excludes the corresponding target pixel or the target patch from the restoration area Ω. This is as described in FIGS. 4 and 5.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An error concealment method using spatial interpolation and exemplar-based image inpainting, comprising:
   receiving, by a decoder, an image including a source area and a restoration area to be restored;
   determining, by the decoder, a target patch which includes a target pixel having the highest priority among pixels positioned in a boundary area of the restoration area; and
   performing, by the decoder, restoring by exemplar-based image inpainting for the target patch or performing spatial interpolation for the target pixel based on a difference between the target patch and a final source patch of the source area,
   wherein the final source patch is a candidate source patch having the smallest value obtained by adding a mean-squared error (MSE) distortion and a side matching distortion (SMD) between the target patch and the candidate source patch among the candidate source patches in the source area.

2. The error concealment method of claim 1, wherein the priority is determined based on a size of a region of the source area in the target patch and a gradient strength for the target pixel at the center of the target patch.

3. The error concealment method of claim 1, wherein the difference is a value obtained by adding a value of the MSE distortion and a value of the SMD between the target patch and the final source patch.

4. The error concealment method of claim 3, wherein the value of the MSE distortion is a mean-squared error between a first area positioned in the source area in the target patch and a second area corresponding to the first area in the candidate source patch.

5. The error concealment method of claim 3, wherein the value of the SMD is a mean-squared error between an outer boundary area of the target patch in the source area and an area corresponding to an inner boundary area which contacting the source area in the target patch in the candidate source patch.

6. The error concealment method of claim 1, wherein in the restoring, the decoder performs the exemplar-based image inpainting for the garget patch when the difference is smaller than a first threshold value and performs spatial interpolation for the target pixel when the difference is equal to or larger than the first threshold value.

7. The error concealment method of claim 6, wherein the first threshold value is determined in proportion to complexity of the target patch.

8. The error concealment method of claim 6, wherein the first threshold value is determined based on a gradient amplitude for the pixels included in the source area of the target patch.

9. The error concealment method of claim 1, wherein the spatial interpolation includes:
   calculating, by a decoder, a gradient amplitude of the target pixel;
   comparing, by the decoder, the gradient amplitude and a second threshold value by means of the decoder; and
   performing, by the decoder, directional interpolation for the target pixel when the gradient amplitude is larger than the second threshold value or performing neighbor interpolation for the target pixel when the gradient amplitude is equal to or smaller than the second threshold value.

10. The error concealment method of claim 9, wherein the second threshold value is determined according to image complexity of the boundary area.

11. The error concealment method of claim 9, wherein the directional interpolation includes:
   calculating an angle of the target pixel;
   determining a first pixel which is closest to the target pixel in an angle direction among the pixels in the source area and a second pixel which is closest to the target pixel in an opposite direction of the angle among the pixels in the source area; and
   determining a value of the target pixel by using the first pixel and the second pixel.

12. The error concealment method of claim 11, wherein the value of the target pixel is determined by performing linear interpolation based on a value of the first pixel and a value of the second pixel.

13. The error concealment method of claim 9, wherein in the neighbor interpolation, the value of the target pixel is determined as an average value for values of the pixels included in the source area while neighboring with the target pixel.

14. An error concealment method for performing an error concealment using an exemplar-based image inpainting, the method comprising:
   determining, by a decoder, a final source patch based on whether a target patch in which a pixel positioned in a boundary area of a restoration area is at the center is matched with a boundary of a candidate source patch positioned in the source area in an image including a source area and the restoration area to be restored and restoring the target patch by using the final source patch,
   wherein the decoder calculates a mean-squared error (MSE) distortion value and a side matching distortion (SMD) value between the target patch and the candidate source patch in the source area and determines a candidate source patch having the smallest value obtained by adding the MSE distortion value and the SMD value of the candidate source patch as the final source patch.

15. The error concealment method of claim 14, wherein the SMD value is a mean-squared error between an outer boundary area of the target patch in the source area and an area corresponding to an inner boundary area which borders the source area of the target patch among the candidate source patches.

* * * * *